United States Patent [19]

Tsukada et al.

[11] Patent Number: 5,419,933
[45] Date of Patent: May 30, 1995

[54] ANNULAR ARTICLE-WRAPPING MEMBER AND METHOD OF MAKING SAME

[75] Inventors: Masamitsu Tsukada; Kiyoshi Murata; Yasushi Ota; Yoshihiko Watanabe, all of Tokyo, Japan

[73] Assignee: Heisei Polymer Co., Ltd., Tokyo, Japan

[21] Appl. No.: 937,283

[22] Filed: Aug. 31, 1992

Related U.S. Application Data

[63] Continuation of Ser. No. 488,825, Mar. 6, 1990, Pat. No. 5,186,989.

[30] Foreign Application Priority Data

Mar. 8, 1989 [JP] Japan ................... 1-55580
Jul. 18, 1989 [JP] Japan ................... 1-185202

[51] Int. Cl.⁶ ............... B65B 53/00; B65B 85/02; B32B 31/20
[52] U.S. Cl. ............... 428/34.1; 428/34.9; 428/195; 428/76; 156/290; 156/308.4; 206/303; 206/304.1; 53/441; 53/546; 53/204; 53/409
[58] Field of Search ............. 428/34.1, 76, 34.9, 428/195; 53/442, 546–547, 204, 409, 462, 463; 206/303, 304, 304.1; 156/296, 308.4

[56] References Cited

U.S. PATENT DOCUMENTS

| | | | |
|---|---|---|---|
| 1,640,022 | 8/1927 | Angier | 428/34.1 |
| 3,005,542 | 10/1961 | Harrison | 206/46 |
| 3,085,373 | 4/1963 | Branick | 53/13 |
| 3,750,364 | 8/1973 | Miura | 206/303 |
| 3,942,298 | 3/1976 | Matzinger et al. | 53/463 |
| 4,079,570 | 3/1978 | Rucker | 53/39 |

FOREIGN PATENT DOCUMENTS

| | | |
|---|---|---|
| 2426557 | 5/1978 | France . |
| 1294175 | 9/1969 | Germany . |
| 2531736 | 2/1976 | Germany . |
| 2025886 | 5/1978 | United Kingdom . |

*Primary Examiner*—Charles R. Nold
*Attorney, Agent, or Firm*—Sughrue, Mion, Zinn, Macpeak & Seas

[57] ABSTRACT

An annular article-wrapping member includes a shrinkable wrapping material is wound on the outer periphery of an annular article to be wrapped in such a manner that the direction of shrinkage of the shrinkable wrapping material coincides with a circumferential direction of the outer periphery of the annular article. The overlapped portions of the wrapping material subsequently are joined together. The shrinkable wrapping material is heated to be shrunk to provide an intermediate wrapping member having sleeve openings having a diameter smaller than an inner diameter of the annular article. Sleeve forming portions of the intermediate wrapping member together in a ring-shape along an inner periphery of the annular article. The portion of the shrinkable wrapping material disposed inwardly of the joined portion is removed by cutting, thereby obtaining the annular article-wrapping member.

17 Claims, 5 Drawing Sheets

ANNULAR ARTICLE-WRAPPING MEMBER AND METHOD OF MAKING SAME

This is a continuation of application Ser. No. 07/488,825, filed Mar. 6, 1990, now U.S. Pat. No. 5,186,989.

BACKGROUND OF THE INVENTION

This invention relates to an annular article-wrapping member in which an annular article, such as a helically-wound wire-like element (for example, electric wire) and a tire, is sealingly wrapped. The invention also relates to a wrapping member in which plastics wrapping materials are joined together by heat sealing, and such a heat-sealed portion is prevented from being ruptured during transport and loading/unloading of the package.

A common conventional method of wrapping an annular article, such as a helically-wound wire-like element (e.g., electric wire) and a tire, is to helically wind a band-like paper sheet or film on the annular article, this method being called "helical wrapping". In some cases, a sleeve wrapping using a shrinkable wrapping material has also been employed.

In the above helical wrapping, the shape of the annular article to be wrapped is the same as the shape of the package after the wrapping, and therefore advantageously its contents can be recognized from the appearance of the package. Another advantage is that since the bore of the annular article is hollow, the package is convenient for transport.

However, the helical wrapping performed by a wrapping machine has not made progress in automation despite the fact that other wrappings have made much progress in rationalization and automation, and at present the helical wrapping still depends on a manual operation or a semi-automatic operation. The reason that the progress of the automatic wrapping has not been made is as follows, when the helical wrapping is automated, a band-like paper sheet or film is helically wound on an annular article with adjacent turns partially overlapping each other, and in this winding step, since the adjacent turns of the helical winding are often inadequately held in contact with each other at the outer periphery, the overlapped portions are displaced relative to each other, so that the helical winding becomes loose, thus affecting the wrapping condition. Further, since a roll of paper or film is passed through the bore of the annular article during the winding, the size of this roll is limited, so that a long winding can not be effected. This results in a disadvantage that a fresh supply of the paper or film must be made frequently.

A further disadvantage of the helical wrapping depending on a wrapping machine is that since the band-like paper sheet or film is helically wound on the annular article, the contents are exposed when the band-like paper sheet or film thus wound is displaced out of place or is ruptured.

SUMMARY OF THE INVENTION

The present invention has been made in view of the foregoing, and an object of the invention is to provide an annular article-wrapping member in which while maintaining the advantage of the helical wrapping that a tight wrapping configuration conforms to the shape of the annular article to be wrapped, the displacement of a wrapping material which is the disadvantage of the helical wrapping is eliminated, and a sealing wrapping is achieved to enhance the wrapping function, and further the automation of the wrapping is made easier.

According to the present invention, there is provided an annular article-wrapping member characterized in that a shrinkable wrapping material is wound on the outer periphery of an annular article to be wrapped in such a manner that the direction of shrinkage of said shrinkable wrapping material coincides with the direction of the outer periphery of said annular article; subsequently the overlapped portions of said wrapping material are joined together; subsequently said shrinkable wrapping material is heated to be shrunk to provide an intermediate wrapping member having sleeve openings having a diameter smaller than the inner diameter of said annular article; subsequently sleeve forming portions of said intermediate wrapping member are joined together in a ring-shape along the inner periphery of said annular article; and that portion of said shrinkable wrapping material disposed inwardly of said joined portion is removed by cutting, thereby obtaining said annular article-wrapping member.

Since the wrapping of the annular article is effected by the shrinkage, heat-sealing, heat-cutting, etc., of the shrinkable wrapping material, the automation of the wrapping is rendered easy. Further, because of the sealed wrapping, the contents will not be exposed, such exposure being encountered with a wrapping form in which a band-like paper sheet or film is wound in overlapping relation.

The annular article-wrapping member of the present invention comprises the film-like shrinkable wrapping material held in intimate contact with the surface of the annular article. A method of wrapping the annular article comprises a first step of covering the outer periphery of the annular article with the shrinkable wrapping member, a second step of effecting the sleeve wrapping in a heating furnace, and a third step of heat-sealing and heat-cutting that portion of the shrinkable wrapping material disposed along the inner periphery of the annular article.

According to the present invention, it is possible to use as the wrapping material any material that may be heat sealed.

Examples of the shrinkable wrapping material used here include a heat-shrinkable film, a heat-shrinkable cloth, and a heat-shrinkable nonwoven fabric. Preferably, there is used a heat-shrinkable material which can be easily sealed, has good shrinking properties, and can be deeply drawn at the time of heating. More preferably, a uniaxially-shrinkable material is used. Preferably, the shrinkage factor or percentage of the heat-shrinkable material used in the present invention is in the range of between 30% and 70%. Where the wrapping material, after wrapping the article, is required to have increased mechanical strength such as a tensile strength and a tearing strength, a cloth or nonwoven fabric is preferably used. Examples of such material includes a uniaxially stretched film of straight-chain polyethylene having short chain branches, and a flat yarn-woven cloth made of a mixture of linear low-density polyethylene having a branched short chain and polypropylene.

According to another aspect of the present invention, there is provided a heat sealed wrapping member having a heat-sealed plastics wrapping material, characterized in that a heat-sealed portion has at least two rows of seal, and at least one of said rows is a row of dot seal.

DETAILED DESCRIPTION OF THE PREFERRED EMBODIMENTS

The invention will now be described with reference to the drawings.

Figure 1A:
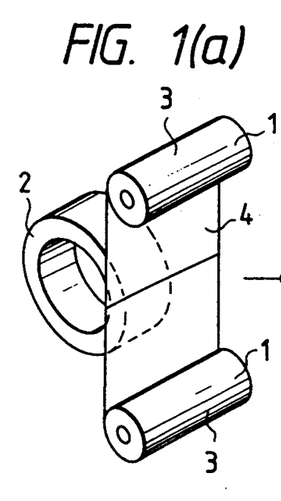
FIGS. 1(a) to 1(c) are perspective views showing the sequence of a first step of a wrapping operation of the present invention.

A first step will be first described with reference to FIG. 1. As shown in FIG. 1(a), shrinkable wrapping materials 1 are wound respectively on two rolls 3 and 3, and the shrinkable wrapping materials 1 are fed respectively from the rolls 3 and 3 and are heat sealed together in the vicinity of a mid point between the two rolls 3 and 3 to provide a flat wrapping surface 4 defined by the shrinkable wrapping material 1. An annular article 2 such as a tire is held on a movable member (not shown) in such a manner that the axis of the annular article 2 is disposed parallel to the two rolls 3 and 3. The outer peripheral surface of the annular article 2 is disposed in opposed relation to the wrapping surface 4. The two rolls 3 on which the shrinkable wrapping materials 1 are wound are spaced vertically (FIG. 1) from each other by a distance greater than the outer diameter of the annular article 2.

Figure 1B:
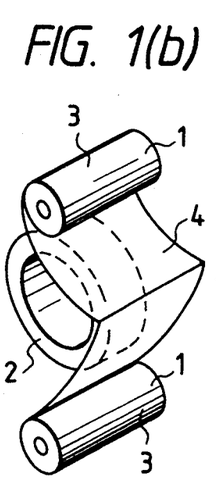
Figure 1C:
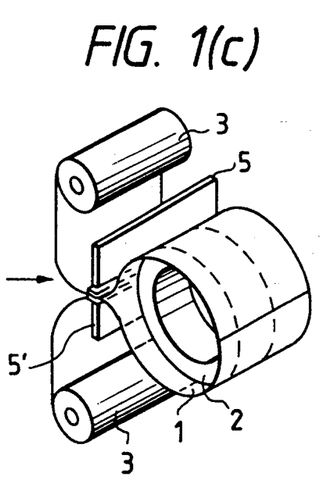

In this condition shown in FIG. 1(a), the annular article 2 held on the movable member (not shown) is moved toward the wrapping surface 4 defined by the shrinkable wrapping material 1. As a result of this movement, about a half of the outer peripheral surface of the annular article 2 is covered by the wrapping surface 4. This condition is shown in FIG. 1(b). The annular article 2 is further moved, and immediately after the annular article is completely passed through the space between the two rolls 3 and 3, sleeve seal heat plate 5 and sleeve seal receptor 5' moves upward and downward (FIG. 1), respectively, toward each other to form the shrinkable wrapping material 1 into a cylindrical shape conforming to the outer peripheral surface of the annular article 2. Then, the shrinkable wrapping material is heat-sealed and heat-cut by the pressing of the sleeve seal heat plates 5 and sleeve seal receptor 5' against each other. This condition is shown in FIG. 1(c). Thus, the cylindrical shrinkable wrapping material 1 enclosing the annular article 2 is prepared.

Figure 2:
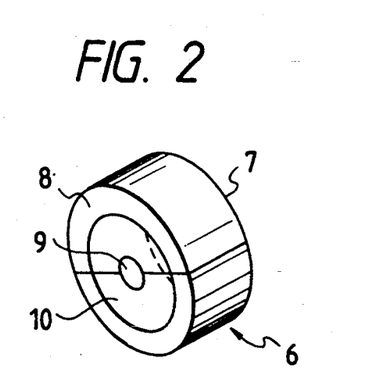
FIG. 2 is a perspective view of an intermediate wrapping member covering an annular article, provided by a second step of the wrapping operation.

Next, in a second step, the cylindrical shrinkable wrapping material 1 enclosing the annular article 2 is passed through a heating furnace and is heat shrunk, thus effecting a sleeve wrapping step. The annular article-wrapping member 6 (hereinafter referred to as "intermediate wrapping member") formed by the shrinkable wrapping material 1 in this sleeve wrapping step is shown in FIG. 2. The intermediate wrapping member 6 includes an outer peripheral wrapping portion 7 covering the outer periphery of the annular article 2, end face-wrapping portions 8 and 8 covering the opposite ends of the annular article 2, respectively, and sleeve opening-forming portions 10 and 10 each having a sleeve opening 9 at its central portion. The width of the shrinkable wrapping material and its shrinkage factor are so determined beforehand that the diameter of the sleeve opening 9 is smaller than the inner diameter of the annular article 2. Although depending on the shrinkage factor of the shrinkable wrapping material 1, it is preferred that the width of the shrinkable wrapping material 1 be 1.1 to 1.3 times greater than the dimension (hereinafter referred to as "waist size") around the transverse cross-section of the body of the annular article 2 (which is substantially twice the width of the annular article plus twice the width of the end thereof).

Figure 3A:
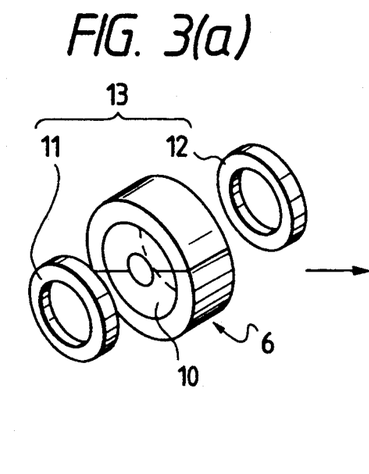
FIGS. 3(a) to 3(c) are perspective views showing a third step of the wrapping operation.
Figure 3B:
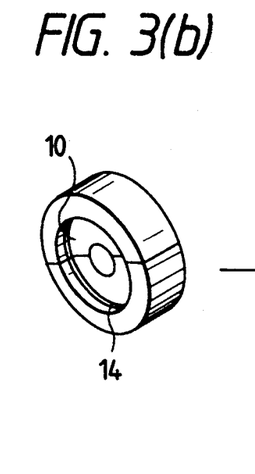
Figure 3C:
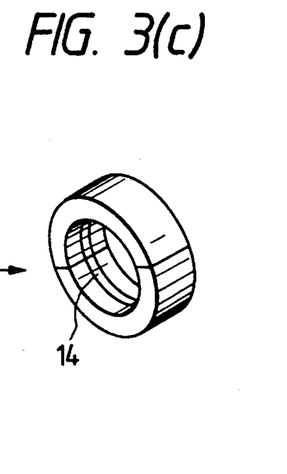

Finally, a third step will now be described with reference to FIG. 3. As shown in FIG. 3(a), using a ring sealer 13 comprising a heating portion 11 and a receptor plate 12 equal in outer diameter to the heating portion 11, the sleeve opening-forming portions 10 and 10 are pressed from their outer sides toward each other along the bore of the annular article to be joined together, so that the sleeve opening-forming portions 10 and 10 are joined together at the inner peripheral surface of the annular article 2. This condition is shown in FIG. 3(b). It is desirable that this joining be carried out immediately after the passage through the heating furnace, so as to facilitate a deep drawing. Thereafter, the unnecessary portion of the sleeve opening-forming portions 10 and 10 disposed radially inwardly of a heat sealed portion 14 formed by the above step is heat-cut, thereby providing the annular article-wrapping member of the present invention shown in FIG. 3(c).

The heat sealing by the ring sealer 13 as well as the heat cutting of the unnecessary portion of the sleeve opening-forming portions 10 disposed radially inwardly of the heat sealed portion 14 will now be described in detail with respect to FIG. 4.

Figure 4:
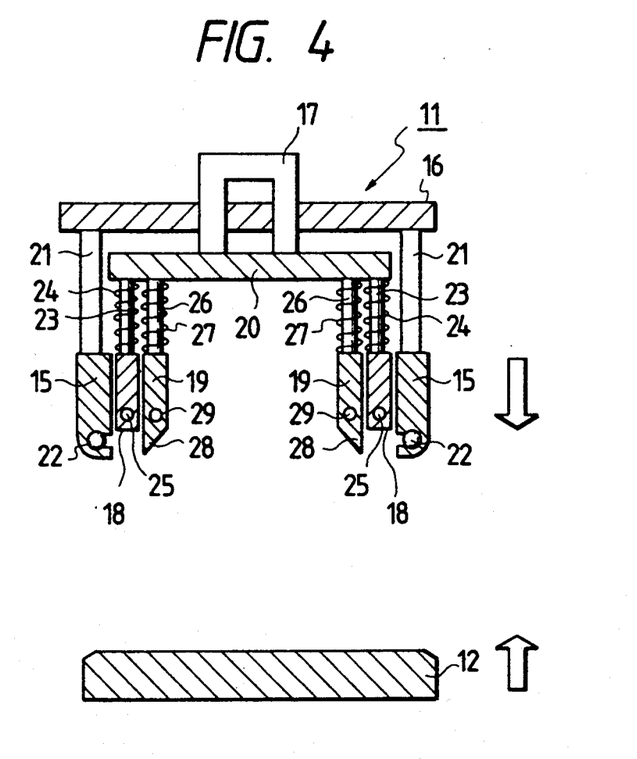
FIG. 4 is a cross-sectional view of a ring sealer.

FIG. 4 shows the ring sealer 13. The ring sealer 13 is used in the steps of heat sealing and heat cutting in the form of a ring-shape, and is of such a construction that it can perform the heating sealing and the heat cutting simultaneously.

The ring sealer 13 comprises the heating portion 11 and the receptor plate 12. The heating portion 11 and the receptor plate 12 are supported on a support member (not shown) such that they are movable toward and away from each other. The heating portion 11 broadly comprises a base plate 16 having a portion 15 mounted thereon, and a movable portion 20 on which a knob 17, a heat sealing portion 18 and a heat knife 19 are mounted.

A plurality of cylindrical connecting portions 21 are mounted on that side of the base plate 16, facing the receptor plate 12, and are arranged at the outer peripheral portion of the base plate 16 along the outer periphery thereof, the connecting portions 21 projecting toward the receptor plate 12. The holder portion 15 has a cylindrical shape, and is mounted on the distal ends of the connecting portions 21. A cooling air pipe 22 is mounted in the distal end portion of the holder portion 15 directed toward the receptor plate 12. The movable portion 20 comprises a disk-shaped member disposed inwardly of the connecting portions 21, and is mounted on the base plate 16 by the knob 17 of a U-shape connected to that side of the movable portion facing away from the receptor plate 12, so that the movable portion 20 is movable toward and away from the receptor plate 12. A plurality of cylindrical connecting portions 23 are mounted on that side of the movable portion 20 facing the receptor plate 12, and are arranged at the outer peripheral portion of the movable portion 20 along the outer periphery thereof, the connecting portions 23 projecting toward the receptor plate 12. A coil spring 24 is wound around each connecting portion 23. The heat sealing portion 18 of a cylindrical shape is mounted on the distal ends of the connecting portions 23 directed toward the receptor plate 12 in such a manner that the heat sealing portion 18 is movable toward and away from the receptor plate 12. The coil springs 24 urge the heat sealing portion 18 toward the receptor plate 12. A heater 25 is mounted in the distal end portion of the heat sealing portion 18 directed toward the receptor plate 12. Further, like the connecting portions 23, a plurality of cylindrical connecting portions 26 projecting toward the receptor plate 12 are also mounted on the movable plate 20 and disposed inwardly of the projections 23. A coil spring 27 is wound around each connecting portion 26 in a manner described above for the coil springs 24. The heat knife 19 of a cylindrical shape, having a blade 28 portion at its distal end directed toward the receptor plate 12, is mounted on the distal ends of the connecting portions 26 directed toward the receptor plate 12, so as to be movable toward and away from the receptor plate 12 in a manner described above for the heat sealing portion 18. The coil springs 27 urge the heat knife 19 toward the receptor plate 12. A heater 29 is mounted in that portion of the heat knife 19 disposed in the vicinity of the proximal end of the blade portion 28, as described above for the heat seal portion 18.

Although these members or portions are made of commonly-used materials, the holder portion 15 is preferably made of a thermally-insulating material.

When the ring sealer 13 is to be used with respect to the annular article-wrapping member of the present invention, the ring sealer 13 and the intermediate wrapping member 6 are first positioned as shown in FIG. 3(a). Then, the receptor plate 12 and the holder portion 15 are mated together, with the shrinkable wrapping material 1 held therebetween. Then, the knob 17 is pushed toward the receptor plate 12 to urge the movable portion 20 toward the receptor plate 12. As a result, the heat sealing portion 18 and the heat knife 19 are pressed against the shrinkable wrapping material 1 to heat-seal and heat-cut the shrinkable wrapping material in a circular shape. At this time, the coil springs 24 and the coil springs 27 respectively press the heat sealing portion 18 and the heat knife 19 against the receptor plate 12 under respective constant pressures, and therefore the heat sealing and heat cutting of the shrinkable wrapping material 1 can be suitably carried out.

In the embodiment, although the long shrinkable wrapping materials are wound respectively on the two rolls 3 and 3, the invention is not restricted to such arrangement, and the shrunk wrapping member can be provided by the same method, using a single sheet of shrinkable wrapping material.

EXAMPLE 1

There was used as an annular article 2 a tire 20.5 cm in width of the outer periphery, 65 cm in waist size and 35 cm in inner diameter. As a shrinkable wrapping material 1, there was used a heat-shrinkable cloth (hereinafter referred to as "cloth") prepared by extrusion-laminating low-density polyethylene on a shrinkable flat yarn-union cloth (having a shrinkage factor of 55% and a width of 80 cm) composed of a mixture of linear low-density polyethylene having a branched short chain and polypropylene (weight ratio of 6:4). The tire 2 and the cloth 1 were positioned as shown in FIG. 1(a), and the tire 2 was moved by a conveyer, so that the outer periphery of the tire 2 was covered with the cloth 1. Then, the cloth 1 was heat sealed as shown in FIG. 1(c), thereby providing the cylindrical cloth i enclosing the tire 2, and it was passed through the heating furnace (200° C.) and was heated to effect the sleeve wrapping, the time required for the passage being 15 seconds. The sleeve opening 9 of the intermediate wrapping member 6 thus produced was smaller than the inner diameter of the tire 2, as shown in FIG. 2. The intermediate wrapping member 6, immediately after the passage through the heating furnace, was subjected to heat sealing and heat cutting by the ring sealer 13 conforming to the inner diameter of the tire 2, thereby preparing the annular article-wrapping member of the present invention.

The annular article-wrapping member was a tight wrap conforming to the outer shape of the annular article, and served the purpose of the present invention.

As described above, in the present invention, the shrinkable wrapping material is wound on the outer periphery of the annular article in such a manner that the direction of shrinkage of the shrinkable wrapping material coincides with the direction of the outer periphery of the annular article; subsequently the overlapped portions of the wrapping material are joined together; subsequently the shrinkable wrapping material is heated to be shrunk to provide the intermediate wrapping member having the sleeve openings having a diameter smaller than the inner diameter of the annular article; subsequently the sleeve forming portions of the intermediate wrapping member of the shrinkable wrapping are joined together in a ring-shape along the inner periphery of the annular article; and that portion of the shrinkable wrapping material disposed inwardly of the joined portion is removed by cutting, thereby obtaining the annular article-wrapping member. With this arrangement, the wrapping material is in intimate contact with the article to be wrapped (the annular article), so that a tight wrapping condition is achieved. Therefore, the shape of the wrapped article can be recognized from the appearance. Therefore, when the annular article-wrapping member of the present invention is applied to commodity or goods, the image of such commodity is improved.

Further, since the completely-sealed wrapping condition is obtained, foreign matter such as dust and dirt are prevented from intruding into the interior of the wrapping member, thus effectively preventing damage to the contents.

Further, in the case of the annular article-wrapping member for wrapping a helically-wound wire-like element (e.g., electric wire), the inner peripheral portion is opened in use, so that a necessary amount of the wire-like element can be taken therefrom, and the remainder is conveniently kept covered with the wrapping material.

In the annular article-wrapping member of the present invention, the wrapping step can be carried out by the sleeve wrapping, the heat sealing, the heat cutting, etc., and therefore the automation of the wrapping of the annular article can be achieved. Therefore, not only the labor and time can be reduced, but also the cost of the wrapping material as well as the cost of physical distribution can be reduced, thus enabling the reduction of the overall cost.

In the meantime, in the wrapping using a plastics wrapping material, the bonding of the wrapping materials by heat sealing has been extensively employed. Such heat sealing is usually a continuous linear heat sealing, and one or more heat sealings have been effected. The plurality of heat sealings, in many cases, are used particularly in the wrapping of foods, and are often used to prevent leakage of contents which is caused by sealing irregularities in the heat sealed portion in a vacuum packaging, or a gas-packed packaging, a liquid-containing packaging.

In such a heat sealing, a rupture (a so-called seal boundary cutting) tends to develop at the boundary between the heat seal portion subjected to the heat and the unsealed portion not subjected to the heat. A method of preventing such a seal boundary cutting is to effect the heat sealing at low temperatures. With this method, however, it is difficult to control the sealing conditions such as the temperature and time of the heat sealing, and therefore a problem tends to be encountered that the sealed portion is liable to be peeled or separated.

Generally, the problem of the seal boundary cutting is not serious when the wrapped article is lightweight, but this problem becomes serious when the wrapped article becomes heavier.

For example, the seal boundary cutting sometimes occurs in the case where a tire is wrapped according to the procedure of the above-mentioned Example 1. When the tire is to be unloaded, the tire is often rolled and is caused to drop from a bed at the height of 1 to 1.5 m, and at this time the tire is deformed. When the tires are to be loaded on a bed of a truck for transport purposes, the tires are piled up to a height of about 2 m. At this time, the tire may accidentally drop, so that the tire is much deformed by a drop impact. In such a case, the wrapping is more liable to be ruptured if the wrapping is tighter, and such rupture concentrates on the heat sealed portion. In other words, the seal boundary rupture occurs. The wrapping subjected to such seal boundary rupture is often broken or ruptured to such an extent that the wrapping does not perform any wrapping function at all.

Further, the above-mentioned annular article-wrapping member covering a helically-wound wire-like element, such as a rope, an electric wire and a rubber hose, and a stack of such helically-wound elements, may be subjected to a rupture at the heat sealed portion because of the flexing or the deformation due to dropping during the loading and unloading.

An embodiment of the present invention described below has been made in view of the above problems, and an object of the invention is to provide a heat-sealed wrapping member in which a rupture at the heat sealed portion is prevented, and a proper wrapping condition can be maintained.

A heat sealed wrapping member of the present invention has a heat-sealed plastics wrapping material, and is characterized in that a heat-sealed portion has at least two rows of seal, and at least one of said rows is a row of dot seal.

In the heat sealed portion having at least two rows of seal one of which is a row of dot seal, the row of dot seal is provided at that side where stresses are applied, that is, a seal boundary. Cutting tends to develop. With this arrangement, even when a stress tending to cause a seal boundary cutting is applied, the spacing between the dot seal row and the other row absorbs the stress, so that even if the heat sealed portion is ruptured, the degree of such rupture is such that the dot seal is ruptured to form small openings in a dot-like manner, and the rupture is not extensive, thus other regions of the sealed portion are kept intact. Therefore, the configuration of the heat sealed portion is kept reasonable, and thus the rupture will not be to such an extent as to adversely affect or damage the wrapping.

Another embodiment of a heat-sealed wrapping member of the present invention will now be described in detail.

As described above, the feature of this embodiment resides in that at least two rows or lines of seal at a heat sealed portion, one of the two rows consisting of a series of dot seals.

It is necessary that the row of dot seals be provided at the side where stresses are applied to the heat sealed portion, that is, at the side where a seal boundary cutting tends to occur. If at least one row of dot seals is provided at such a stress-developing side, the other row or rows of seal may be either of a continuous line of seal and a row of dot seals. Preferably, the dot seals constituting the dot seal row have a rectangular shape or a square shape, and more preferably have a rectangular shape having rounded corners; however, the dot seal is not limited to such shape, and for example, a circular shape, an oval shape or a star-like shape may be employed.

Figure 5:
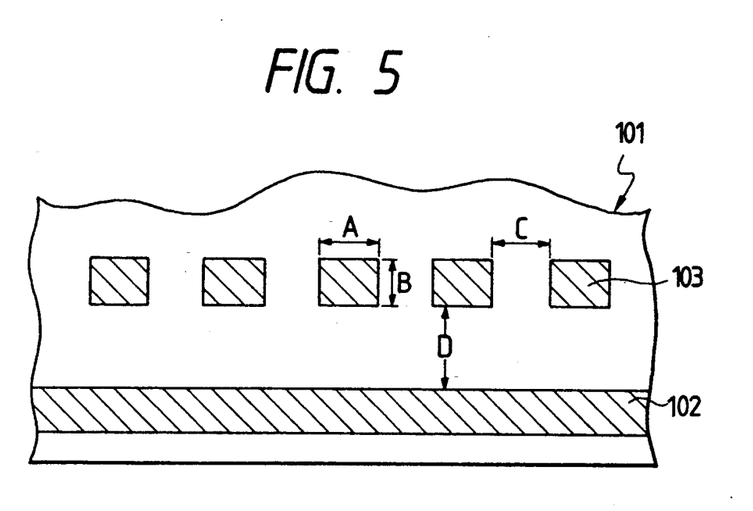
FIG. 5 is a fragmentary view of a heat sealed portion of the wrapping member.

One example of the heat sealed portion of the heat-sealed wrapping member is shown in FIG. 5. This heat sealed portion has the row 101 of dot seals 103, and a continuous line 102 of seal. The dot seals 103 are arranged along the length of the heat sealed portion to form the row 101. Stresses tending to cause a seal boundary cutting are applied to the heat sealed portion at the dot seal row 101.

The size of the dot seal 103 is determined in view of the size and shape of a rupture opening produced when the dot seal 103 is ruptured or broken. It is desirable in view of the shape of such a rupture opening and so on that the ratio of the length A (in the direction of the length of the heat sealed portion) of the dot seal 103 to its width B be in the range of between 1 and 10. The distance or spacing C between the adjacent dot seals 103 and 103 is determined by the required strength of the heat sealed portion, that is, the stress applied to the heat sealed portion. It is preferred from the strength of the heat sealed portion that the ratio of the distance C to the length A be in the range of between 0.5 and 10. The distance D between the dot seal row 101 and its adjacent seal row (the seal line 102 here in this embodiment) is determined by the amount of deformation of an article to be wrapped and also by a stress caused by this deformation and applied to the heat sealed portion. If the deformation amount and the stress are large, it is necessary that the distance D should be increased. It is preferred that the ratio of the distance D to the length A be in the range of between 0.5 and 15. Because the boundary of the seal line 102 and its adjacent unsealed portion is most weak and is liable to be ruptured, the width of the seal line 102 is not so related to the strength. Therefore, the width of the seal line 102 does not need to be increased, and the width of about 2 mm to about 5 mm is sufficient. Rather, the narrow width is desirable from the viewpoint of the appearance.

Examples of heat sealing methods for effecting the above dot sealing and the above line sealing includes a hot plate seal, or an impulse seal, an ultrasonic seal, a high-frequency seal. Either of the dot sealing and the line sealing may be carried out earlier, and also they may be carried out simultaneously.

The heat sealed wrapping member of the present invention is produced using this annular article-wrapping method, as described above.

Figure 6:
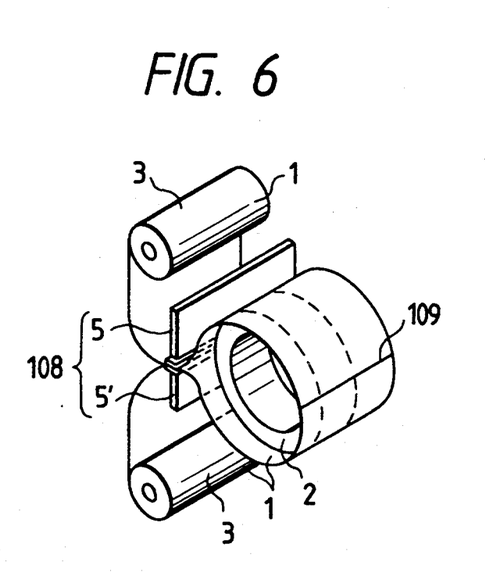
FIG. 6 is a perspective view of a first step of a modified wrapping operation of the present invention.

First, as shown in FIG. 6, an outer peripheral surface of an annular article 2 such as a tire is covered with cloths 1, and the cloths 1 are heat-sealed by a sleeve hot plate sealing device 108 comprising a sleeve seal hot plate 5 and a sleeve seal receptor plate 5' to form a cylindrical cloth 1 containing the annular article disposed centrally of the width of the cloth 1. The thus heat-sealed portion of a linear form is referred to as a sleeve seal portion 109.

The sleeve seal portion 109 is formed by the heat sealing effected by the sleeve seal hot plate 5 and the sleeve seal receptor 5' of the sleeve hot plate sealing device 108. A portion of the sleeve seal hot plate 5 is shown in FIG. 7, and the sleeve seal portion 109 is shown in FIG. 8.

Figure 7:
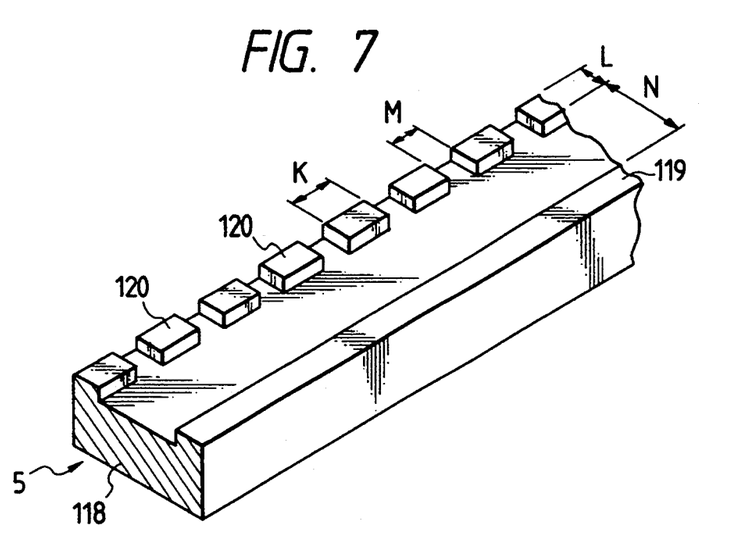
FIG. 7 is a perspective view of a portion of a sleeve seal hot plate 5.
Figure 8:
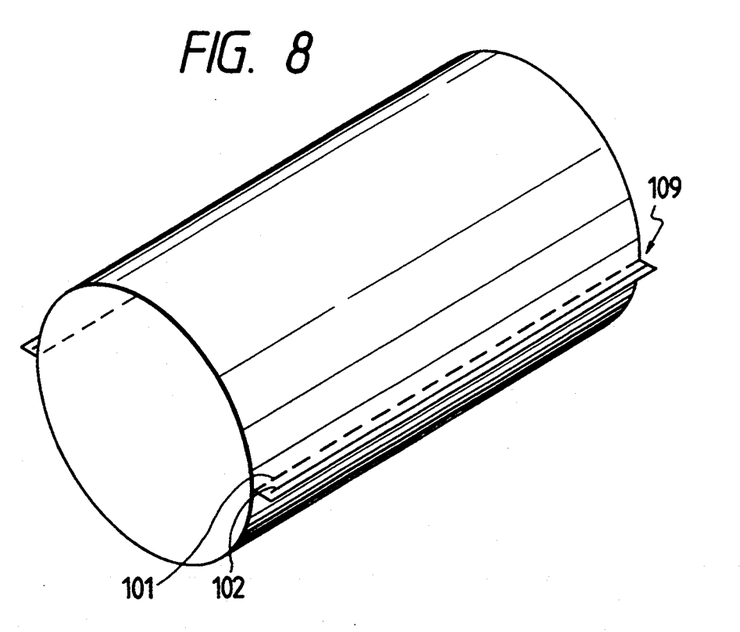
FIG. 8 is a perspective view of an intermediate wrapping member.

As shown in FIG. 7, the sleeve seal hot plate 5 includes a base plate 118 of a rectangular shape, a seal line-forming portion 119 in the form of a continuous elongate wall formed on one surface of the base plate 118 and extending continuously along and adjacent to one long side thereof, and row of dot seal-forming portions 120 of a rectangular cross-sectioned formed on the one surface of the base plate 118 adjacent to the other long side thereof and spaced from one another at predetermined intervals along the other long side. The sleeve seal receptor plate 5' has substantially the same size as the sleeve seal hot plate 5 and has a flat surface or side. The cloths 1 are interposed between the heated sleeve seal hot plate 5 and the plate-like receptor plate 5', and then the sleeve seal hot plate 5 and the sleeve seal receptor plate 109 are pressed against each other, thereby forming the sleeve seal portion 109. As shown in FIG. 8, the dot seal row 101 and the seal line 102 are arranged at this straight sleeve seal portion 109, and spaced a predetermined distance from each other. The dot seal row 101 is disposed close to the annular article to be wrapped.

A ring-shaped sealed portion 14 is formed as a result of the heat sealing effected by a ring-shaped hot plate 11 and a ring-shaped receptor plate 12 of a ring-shaped hot plate sealing device 13. A portion of the ring-shaped hot plate 11 is shown in FIG. 9 on an enlarged scale, and a portion of the ring-shaped sealed portion 14 is shown in FIG. 10 on an enlarged scale.

Figure 9:
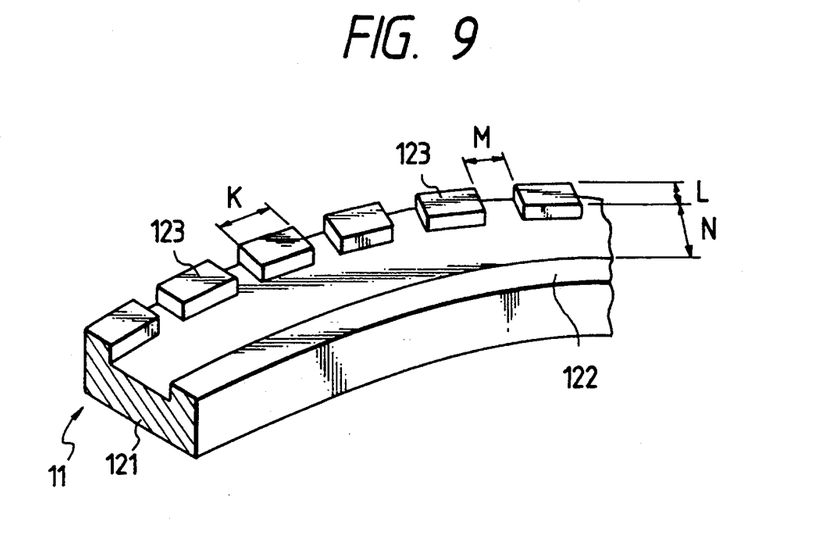
FIG. 9 is a perspective view of a portion of a ring-shaped hot plate.
Figure 10:
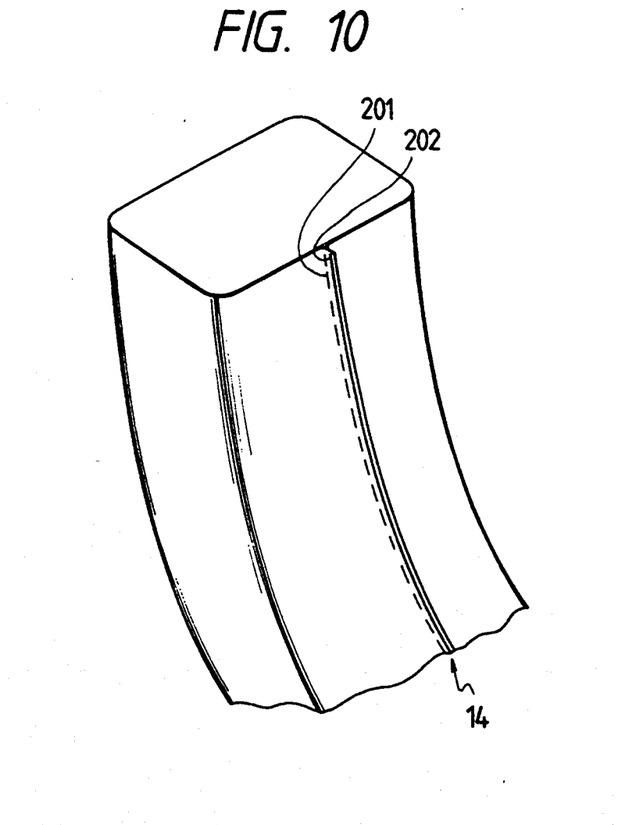
FIG. 10 is a perspective view of a portion of a ring-shaped sealed portion.

As shown in FIG. 9, the ring-shaped hot plate 11 includes an annular or ring-shaped base plate 121, a ring-shaped seal line-forming portion 122 of a rectangular transverse cross-section continuously formed on one surface of the base plate 121 adjacent to the inner periphery of the base plate 121, and a ring-shaped row of dot seal-forming portions 123 of a generally rectangular cross-section formed on the one surface of the base plate 121 adjacent to the outer periphery thereof. The ring-shaped receptor plate 12 has substantially the same size as the ring-shaped hot plate 11, and has a flat surface. The cloth 1 is interposed between the heated ring-shaped hot plate 11 and the ring-shaped receptor plate 12, and these two plates are pressed against each other, thereby forming the ring-shaped se&led portion 14. As shown in FIG. 10, at the ring-shaped sealed portion 14, the dot seal row 201 and the seal line 202 are spaced a predetermined distance from each other, and the dot seal row 201 is disposed close to the wrapped annular article.

With respect to such a heat-sealed wrapping member of the present invention, even when the annular article such as a tire or a helically-wound rope is deformed due to a drop impact or the like, only the row 101 of dot seal (which is disposed close to the tire) at either the ring-shaped sealed portion 14 or the sleeve sealed portion 109 may be ruptured or broken, so that the wrapping is loosened only at that ruptured portion, and the whole of the wrapping member will not be loosened.

The heat-sealed wrapping member of the present invention will now be illustrated by way of Examples and Comparative Examples in which the above-mentioned annular article-wrapping method was used.

EXAMPLE 2

As an annular article 2, there was used a tire (185 R14) having an outer diameter of 660 mm, an inner diameter of 355 mm, a tread width of 185 mm. As a cloth 1, there was used a heat-shrinkable cloth prepared by extrusion-laminating a low-density polyethylene resin on a shrinkable flat yarn-woven cloth of a polyolefin type having a shrinkage factor of 60% (110° C.×1 min.) and a width of 850 mm.

With respect to the sleeve seal hot plate 5 of the sleeve hot plate sealing device 108 for forming a sleeve sealed portion 109, the surface of each dot seal-forming portion 120 had a rectangular shape having a length K of 10 mm in the direction of the length of the hot plate 5 and a width L of 3 mm in the direction perpendicular to the longitudinal axis of the hot plate 5. The distance or spacing M between the adjacent dot seal-forming portions 120 and 120 was 10 mm, and the distance N between the row of dot seal-forming portions 120 and the seal line-forming portion 119 was 4 mm. The width of the seal line-forming portion 119 was 3 mm. Using the sleeve seal hot plate 5 and the sleeve seal receptor plate 5', a heat pressing was carried out at 180° C. for 3 seconds to form the sleeve sealed portion 109, thereby forming a cylindrical cloth 1 containing the annular article 2 disposed generally centrally of the width of the cloth 1.

The cylindrical cloth 1 was heated at 200° C. for 15 seconds in a heating furnace to effect a sleeve wrapping, thereby obtaining an intermediate wrapping member 6 containing the annular article.

With respect to the ring-shaped hot plate 11 of the ring-shaped hot plate sealing device 13 for forming a ring-shaped sealed portion 14, the surface of each dot seal-forming portion 123 had a length K of 15 mm in the circumferential direction and a width L of 3 mm in the radial direction. The distance M between the adjacent dot seal-forming portions 123 and 123 was 10 mm, and the distance N between the ring-shaped row of dot seal-forming portions 123 and the ring-shaped seal line-forming portion 122 was 12 mm. The width of the seal line-forming portion 122 was 5 mm. Using the ring-shaped hot plate 11 and the ring-shaped receptor plate 12, a heat pressing was carried out at 180° C. for 2 seconds to form the ring-shaped sealed portion 14 and to cut off the unnecessary portion of the cloth 1 disposed radially inwardly of the ring-shaped sealed portion 14, thereby preparing a heat-sealed wrapping member covering the annular article (tire).

The heat sealed wrapping member thus obtained was a tight wrapping in intimate contact with the outer periphery of the tire.

The heat-sealed wrapping members thus obtained and covering the tire were caused to drop from heights of 1.5 m and 2.5 m, respectively, thus conducting a drop test. Then, the degree of rupture of the heat sealed portion of each wrapping member was evaluated, and the results are shown in Table 1 below. In the drop test, the annular article (tire) was disposed vertically and was caused to drop, so that the tread of the tire struck against the ground.

The amount of variation (i.e., deformation amount) in the waist size (i.e., the dimension around the transverse cross-section of the annular article) of the annular article obtained when it dropped was measured. The results are shown in Table 2 below. Such variation amounts were also measured with respect to other kinds of tires, and the results thereof are also shown in Table 2. The variation amount was measured as follows. First, a strap was tightly wound around the waist of the annular article in the form of a loop. Then, the wrapped annular article was caused to drop from the predetermined height. At that time, the annular article was deformed to increase the waist size, so that the size of the loop of the strap around the waist of the annular article was increased. After the dropping was finished, the strap loop was kept at the increased size, and the size (length) of the strap loop was measured after the drop test, and was compared with the waist size of the annular article measured beforehand, thus determining the amount of the variation. The distance between the dot seal row 101, 201 and the seal line 102, 202 is determined in view of the amount of the variation.

EXAMPLE 3

A rope formed by twisting a polyethylene monofilament was formed into a coil shape, and five of such coil arrangements were stacked one upon another and were tied together to provide an annular article 2. The annular article had an outer diameter of 380 mm, an inner diameter of 150 mm and a width of 740 mm. A cloth 1 was made of the same material as that used in Example 2, but had a width of 950 mm.

According to the same procedure as described above in Example 2, a sleeve sealed portion 109 was formed to thereby obtain a cylindrical cloth 1 containing the annular article 2 disposed centrally of the width of the cloth 1.

The cylindrical cloth 1 was heated at 200° C. for 13 seconds in a heating furnace for shrinkage wrapping, thereby obtaining a heat sealed wrapping member.

According to the same procedure of Example 2, the heat sealed wrapping members thus obtained were subjected to a drop test. The results are shown in Table 1. Also, as in Example 2, the amount of variation in the waist size was measured, and the results thereof are shown in Table 2.

EXAMPLE 4

With respect to the sleeve seal hot plate 5, the surface of each dot seal-forming portion 120 had a rectangular shape having a length K of 3 mm in the direction of the length of the hot plate 5 and a width L of 2 mm in the direction perpendicular to the longitudinal axis of the hot plate 5. The distance or spacing M between the adjacent dot seal-forming portions 120 and 120 was 10 mm, and the distance N between the row of dot seal-forming portions 120 and the seal line-forming portion 119 was 5 mm. The width of the seal line-forming portion 119 was 3 mm. with respect to the ring-shaped hot plate 11, the surface of each dot seal-forming portion 123 had a length K of 3 mm in the circumferential direction and a width L of 2 mm in the radial direction. The distance M between the adjacent dot seal-forming portions 123 and 123 was 22 mm, and the distance N between the ring-shaped row of dot seal-forming portions 123 and the ring-shaped seal line-forming portion 122 was 15 mm. The width of the seal line-forming portion 122 was 3 mm.

Except for the above, a heat sealed wrapping member was prepared according to the same procedure of Example 2. Drop tests of the heat sealed wrapping members thus obtained were carried out as in Example 2. The results are shown in Table 1.

EXAMPLE 5

A heat sealed wrapping member was prepared according to the same procedure of Example 3 except that the sleeve seal hot plate 5 of Example 4 were used. Drop tests of the heat sealed wrapping members thus obtained were carried out as in Example 2. The results are shown in Table 1.

Comparative Example 1

A heat sealed wrapping member was prepared according to the same procedure of Example 2 except for the following. The row of dot seal-forming portions 120 of the sleeve seal hot plate 5 was replaced by a seal line-forming portion. The width of each of the two seal line-forming portions was 3 mm, and the distance between those two seal line-forming portions was 4 mm. The ring-shaped row of dot seal-forming portions of the ring-shaped hot plate 11 was replaced by a ring-shaped seal line-forming portion. The width of each of the two seal line-forming portions was 5 mm, and the distance between those two seal line-forming portions was 10 mm.

Drop tests of the heat sealed wrapping members thus obtained were carried out as in Example 2. The results are shown in Table 1.

Comparative Example 2

A heat sealed wrapping member was prepared according to the same procedure of Example 3 except that the sleeve seal hot plate 5 of Comparative Example 1 were used. Drop tests of the heat sealed wrapping members thus obtained were carried out as in Example 2. The results are shown in Table 1.

Comparative Example 3

A heat sealed wrapping member was prepared according to the same procedure of Example 2 except that the sleeve seal hot plate 5 had only the seal line-forming portion 119 having a width of 5 mm, and that the ring-shaped hot plate 11 had only the ring-shaped seal line-forming portion having a width of 5 mm. Drop tests of the heat sealed wrapping members thus obtained were carried out as in Example 2. The results are shown in Table 1.

Comparative Example 4

A heat sealed wrapping member was prepared according to the same procedure of Example 3 except that the sleeve seal hot plate 5 of Comparative Example 3 were used. Drop tests of the heat sealed wrapping members thus obtained were carried out as in Example 2. The results are shown in Table 1.

Comparative Example 5

A heat sealed wrapping member was prepared according to the same procedure of Example 2 except that the sleeve seal hot plate 5 had only the seal line-forming portion 119 having a width of 10 mm, and that the ring-shaped hot plate 11 had only the ring-shaped seal line-forming portion having a width of 10 mm. Drop tests of the heat sealed wrapping members thus obtained were carried out as in Example 2. The results are shown in Table 1.

Comparative Example 6

A heat sealed wrapping member was prepared according to the same procedure of Example 3 except that the sleeve seal hot plate of Comparative Example 5 was used. Drop tests of the heat sealed wrapping members thus obtained were carried out as in Example 2. The results are shown in Table 1.

×: does not look tight and has a bad appearance.
(2) Evaluation standards for Drop test:
⊚: The size of rupture is not more than 5 mm.
◯: The size of rupture is not more than 10 mm.
△: The size of rupture is not more than 20 mm.
×: The size of rupture is more than 20 mm.
(3) When calculating the rupture rate, those ruptures having a length of more than 10 mm were considered as ruptures.

As shown in Table 1, in the drop tests of 1.5 m height, about 40% of the heat sealed wrapping members of Comparative Examples 1, 3 and 5 covering the tires were subjected to ruptures due to a seal boundary cutting at their ring-shaped sealed portions 14, and also subjected to ruptures at their sleeve sealed portion 109. The rupture extended over a length of 25 mm to 230 mm along the heat seal, so that the wrapping function was lost. Further, in the drop tests of 2.5 m height, all of the heat sealed wrapping members of these Comparative Examples were subjected to seal boundary cuttings at their ring-shaped sealed portions 14, and about 60% of them were subjected to ruptures at their sleeve sealed portions 109. The length of such rupture was greater than that developing at the drop test of 1.5 m height, and was in the range of between 60 mm and 280 mm.

On the other hand, although 80% of the heat sealed wrapping members of Example 4 had small openings at the dot seal portions of the ring-shaped sealed portions 14 in the drop test of 1.5 m height, the size of the ruptures was not more than 5 mm. The number of the small openings were 5 to 10 over a range of 7 to 20 cm, but the

TABLE 1

| | | Drop test | | | | | | | | | | | |
|---|---|---|---|---|---|---|---|---|---|---|---|---|---|
| | | Height of 1.5 m | | | | | | Height of 2.5 m | | | | | |
| | | Ring-shaped sealed portion | | | Sleeve sealed portion | | | Ring-shaped sealed portion | | | Sleeve sealed portion | | |
| | | | Degree of rupture (mm) | | | Degree of rupture (mm) | | | Degree of rupture (mm) | | | Degree of rupture (mm) | |
| | Wrapping Condition | Rupture rate (%) | Max | Min | Rupture rate (%) | Max | Min | Rupture rate (%) | Max | Min | Rupture rate (%) | Max | Min | Evaluation |
| Ex. 2 | ◯ | 35 | 18 | 12 | 20 | 15 | 9 | 100 | 120 | 10 | 35 | 12 | 10 | △ |
| Ex. 3 | ◯ | — | — | — | 15 | 15 | 6 | — | — | — | 20 | 20 | 10 | △ |
| Ex. 4 | ◯ | 0 | 4 | 2 | 0 | 3 | 2 | 0 | 5 | 2 | 0 | 3 | 2 | ⊚ |
| Ex. 5 | ◯ | — | — | — | 0 | 3 | 1 | — | — | — | 0 | 4 | 2 | ⊚ |
| Com. Ex. 1 | ◯ | 40 | 210 | 130 | 15 | 200 | 40 | 100 | 270 | 120 | 65 | 230 | 70 | × |
| Com. Ex. 2 | ◯ | — | — | — | 15 | 180 | 20 | — | — | — | 40 | 200 | 60 | × |
| Com. Ex. 3 | ◯ | 45 | 210 | 150 | 15 | 230 | 25 | 100 | 280 | 150 | 60 | 220 | 60 | × |
| Com. Ex. 4 | ◯ | — | — | — | 15 | 200 | 10 | — | — | — | 40 | 230 | 40 | × |
| Com. Ex. 5 | ◯ | 45 | 205 | 150 | 15 | 225 | 40 | 100 | 270 | 150 | 50 | 210 | 60 | × |
| Com. Ex. 6 | ◯ | — | — | — | 15 | 180 | 20 | — | — | — | 40 | 230 | 50 | × |

Ex.: Example;
Com. Ex.: Comparative Example

TABLE 2

| Wrapped article | Drop height of 1.5 m | | | Drop height of 2.5 m | | |
|---|---|---|---|---|---|---|
| | Average | Max (mm) | Min (mm) | Average | Max (mm) | Min (mm) |
| Rope stack | 6 | 7 | 4 | 8 | 10 | 6 |
| Tire 155SR13 | 18 | 20 | 13 | 24 | 28 | 16 |
| 185R14 | 17 | 21 | 14 | 24 | 28 | 21 |
| 295/60VR14 | 22 | 25 | 20 | 24 | 25 | 22 |
| 205/70VR15 | 15 | 20 | 13 | 17 | 21 | 15 |
| 245/45ZR16 | 19 | 21 | 16 | 20 | 23 | 18 |

In Table 1:
(1) Evaluation standards for Wrapping (finished) condition:
◯: looks tight and has a good appearance.
△: has a good appearance but does not look tight.

wrapping function was still maintained sufficiently. The sleeve sealed portions 109 were not subjected to a rupture. In the drop test of 2.5 m height, although small openings were produced at the dot seal portions of all of the ring sealed portions 14, the size of such small openings was not more than 5 mm, and the number was 8 to 15 over a range of 15 to 27 cm. However, the seal line portions were not subjected to a rupture, and also the sleeve sealed portions 109 were not subjected to a rupture.

In the drop tests of 1.5 m height, about 15% of the heat sealed wrapping members of Comparative Examples 2, 4 and 6 covering the ropes were subjected to seal boundary cuttings at the sleeve sealed portions 109 over a length of 10 to 200 mm. In the drop tests of 2.5 m height, about 40% of the wrapping members of these Comparative Examples were subjected to seal boundary cuttings at the sleeve sealed portions over a length of 40 to 230 mm.

On the other hand, in the drop test of 1.5 m height, although 20% of the heat sealed wrapping members of Example 5 had small openings at the dot seal portions, the size of such small openings was not more than 5 mm. The number of the small openings was 6 to 22 over a range of 70to 220 mm, but the wrapping function was still maintained sufficiently. In the drop test of 2.5 m height, although 45% of the wrapping members of Example 5 had small openings at the dot seal portions, the size of such small openings was not more than 5 mm, and its number was 10 to 27 over a range of 110 to 270 mm. However, the seal line forming portions were not subjected to a rupture, and the wrapping function was still maintained sufficiently.

The heat sealed wrapping member of the present invention has the heat-sealed plastics wrapping material, and is characterized in that the heat-sealed portion has at least two rows of seal, and at least one of the rows is a row of dot seal. With this arrangement, even in the case of a tight wrapping, the heat sealed portion is not subjected to a rupture (i.e., a seal boundary cutting), and therefore even when the wrapped article is handled rather roughly during the loading and unloading, the wrapping is not damaged, so that the wrapping function can be maintained.

Therefore, the heat sealed wrapping member of the present invention is particularly useful for those annular articles susceptible to deformation and displacement during the loading and unloading, such as helically-wound electric wires, ropes and hoses, a tire, and a corrugated cardboard box.

We claim:

1. A wrapped, heat-sealed article, comprising:
an article having an annular shape;
a protective covering comprising plastic material completely and closely overlying said article;
at least one heat seal, formed by joining abutting ends of said plastic material which extend outwardly from said article in a substantially radial direction, such that said plastic material substantially completely surrounds and encloses said article, wherein said at least one heat seal comprises overlapped portions of said plastic material, wherein said at least one heat seal includes first and second heat seal portions comprising overlapped portions of said plastic material positioned substantially in a plane including a rotational axis of said annular article; and
wherein said at least one heat seal comprises at least two rows of seal, at least one of said at least two rows is a row of dot seal.

2. A wrapped, heat-sealed article according to claim 1, wherein said article having an annular shape has inner and outer surfaces and end faces joining edges of said inner and outer surfaces to form a cylinder and to define an aperture, said plastic material completely and closely overlying said inner and outer surfaces and said end faces of said article.

3. A wrapped, heat-sealed article according to claim 2, further comprising a ring seal formed on said inner surface of said annular article.

4. A wrapped, heat-sealed article according to claim 3, wherein said ring seal is formed along an entire circumference of said inner surface of said annular article.

5. A wrapped, heat-sealed article according to claim 1, wherein said first heat seal portion is formed perpendicularly to said rotational axis of said article and extends radially along said article.

6. A wrapped, heat-sealed article according to claim 1, wherein said second heat seal portion is formed so as to traverse said annular article in a direction normal to an outer circumference of said article.

7. A wrapped, heat-sealed article, comprising:
an article having an annular shape;
a protective coating comprising plastic material completely and closely overlying said article; and
at least one heat seal, formed by joining abutting ends of said plastic material which extend outwardly from said article in a substantially radial direction, such that said plastic material substantially completely surrounds and encloses said article;
wherein said article having an annular shape has inner and outer surfaces and end faces joining edges of said inner and outer surfaces to form a cylinder and to define an aperture, said plastic material completely and closely overlying said inner and outer surfaces and said end faces of said article, wherein said at least one heat seal comprises overlapped portions of said plastic material, said overlapped portions of said plastic material traversing said annular article in a direction normal to the circumference of said annular article; and
wherein said wrapped, heat-sealed article is produced by an apparatus comprising:
means for winding said plastic material on an outer periphery of said article to be wrapped, thereby forming overlapped portions of said plastic material;
means for joining said overlapped portions of said plastic material together;
means for forming said plastic material to provide a wrapped intermediate member formed by joining said overlapped portions, said wrapped intermediate member having sleeve forming portions having a bore diameter smaller than an inner diameter of said article;
means for joining sleeve forming portions of said wrapped intermediate member together in a ring-shape along an inner periphery of said article to obtain said wrapped, heat-sealed article; and
wherein said at least one heat seal comprises at least two rows of seal, at least one of said at least two rows is a row of dot seal.

8. A wrapped, heat-sealed article, comprising:
an article having an annular shape;
a protective covering comprising plastic material completely and closely overlying said article; and
at least one heat seal, formed by joining abutting ends of said plastic material which extend outwardly from said article in a substantially radial direction, such that said plastic material substantially completely surrounds and encloses said article;

wherein said article having an annular shape has inner and outer surfaces and end faces joining edges of said inner and outer surfaces to form a cylinder and to define an aperture, said plastic material completely and closely overlying said inner and outer surfaces and said end faces of said article, wherein said at least one heat seal comprises overlapped portions of said plastic material, said overlapped portions of said plastic material traversing said annular article in a direction normal to the circumference of said annular article; and wherein said wrapped, heat-sealed article is produced by an apparatus comprising:
means for winding said plastic material on an outer periphery of said article to be wrapped in such a manner that a direction of shrinkage of said plastic material coincides with a circumferential direction of the outer periphery of said article;
means for joining overlapped portions of said plastic material;
means for heating said plastic material to provide a wrapped intermediate member having sleeve forming portions having a bore diameter smaller than an inner diameter of said article;
means for joining said sleeve forming portions of said wrapped intermediate member together in a ring-shape along an inner periphery of said article;
means for removing a predetermined amount of said ring-shaped portion of said wrapped intermediate member disposed inwardly of said inner periphery of said article by cutting to leave only a relatively small amount of said ring-shaped portion to form a sleeve seal, thereby obtaining said wrapped, heat-sealed article; and
wherein said at least one heat seal comprises at least two rows of seal, at least one of said at least two rows is a row of dot seal.

9. A wrapped, heat-sealed article, comprising:
an article having an annular shape;
a protective covering comprising plastic material completely and closely overlying said article; and
at least one heat seal, formed by joining abutting ends of said plastic material which extend outwardly from said article in a substantially radial direction, such that said plastic material substantially completely surrounds and encloses said article;
wherein said article having an annular shape has inner and outer surfaces and end faces joining edges of said inner and outer surfaces to form a cylinder and to define an aperture, said plastic material completely and closely overlying said inner and outer surfaces and said end faces of said article, wherein said at least one heat seal comprises overlapped portions of said plastic material, said overlapping portions of said plastic material traversing said annular article in a direction normal to the circumference of said annular article; and
wherein said wrapped heat-sealed article is produced by a method comprising the following steps:
winding said plastic material on an outer periphery of said article to be wrapped, thereby forming overlapped portions of said plastic material;
joining said overlapped portions of said plastic material together;
forming said plastic material to provide a wrapped intermediate member having sleeve openings having a diameter smaller than an inner diameter of said article;
joining sleeve forming portions of said wrapped intermediate member together in a ring-shape along an inner periphery of said article, thereby obtaining said wrapped, heat-sealed article; and
wherein said at least one heat seal comprises at least two rows of seal, at least one of said at least two rows is a row of dot seal.

10. A wrapped, heat-sealed article, comprising:
an article having an annular shape;
a protective covering comprising plastic material completely and closely overlying said article; and
at least one heat seal, formed by joining abutting ends of said plastic material which extend outwardly from said article in a substantially radial direction, such that said plastic material substantially completely surrounds and encloses said article;
wherein said article having an annular shape has inner and outer surfaces and end faces joining edges of said inner and outer surfaces to form a cylinder and to define an aperture, said plastic material completely and closely overlying said inner and outer surfaces and said end faces of said article, wherein said at least one heat seal comprises overlapped portions of said plastic material, said overlapped portions of said plastic material traversing said annular article in a direction normal to the circumference of said annular article; and
wherein said article having an annular shape has inner and outer surfaces and end faces joining edges of said inner and outer surfaces to form a cylinder and to define an aperture, said plastic material completely and closely overlying said inner and outer surfaces and said end faces of said article, and
wherein said wrapped heat-sealed article is produced by a method comprising the following steps:
winding said plastic material on an outer periphery of said article to be wrapped in such a manner that the direction of shrinkage of said shrinkable wrapping material coincides with a circumferential direction of the outer periphery of said article;
joining overlapped portions of said plastic material together;
heating said plastic material to provide a wrapped intermediate member having sleeve openings having a diameter smaller than an inner diameter of said article;
joining sleeve forming portions of said wrapped intermediate member together in a ring-shape along an inner periphery of said article;
removing a predetermined amount of said ring-shaped portion of said wrapped intermediate member disposed inwardly of said inner periphery of said article by cutting to leave only a relatively small amount of said ring-shaped portion to form a sleeve seal, thereby obtaining said wrapped, heat-sealed article; and
wherein said at least one heat seal comprises at least two rows of seal, at least one of said at least two rows is a row of dot seal.

11. A wrapped, heat-sealed article, comprising:
an article having an annular shape;
a protective covering comprising plastic material completely and closely overlying said article; and
at least one seal, formed by joining abutting ends of said plastic material which extend outwardly from said article in a substantially radial direction, such that said plastic material substantially completely surrounds and encloses said article, wherein said at least one seal comprises at least one heat seal, said at least one heat seal comprising first and second heat seal portions formed by overlapped portions of said plastic material, said first heat seal portion comprising overlapped portions of said plastic material traversing said annular article in a direction normal to a first circumference of said annular article; and wherein said at least one heat seal comprises at least two rows of seal, at least one of said at least two rows is a row of dot seal.

12. A wrapped, heat-sealed article according to claim 11, wherein said article having an annular shape has inner and outer surfaces and end faces joining edges of said inner and outer surfaces to form a cylinder and to define an aperture, said plastic material completely and closely overlying said inner and outer surfaces and said end faces of said article.

13. A wrapped, heat-sealed article according to claim 11, wherein said second heat seal portion of said at least one heat seal comprises overlapped portions of said plastic material formed perpendicular to an axis through an aperture defined by said annular article.

14. A wrapped, heat-sealed article according to claim 12, further comprising a ring seal formed on said inner surface of said article.

15. A wrapped, heat-sealed article according to claim 14, wherein said ring seal is formed along an entire circumference of said inner surface of said article.

16. A wrapped, heat-sealed article according to claim 11, wherein said first seal portion of said at least one heat seal comprises overlapped portions of said plastic material formed in a direction parallel to the axis of the annular article.

17. A wrapped, heat-sealed article according to claim 11, wherein said first circumference is an outer circumference of said annular article.

* * * * *